(12) United States Patent
Marietta et al.

(10) Patent No.: US 11,577,609 B2
(45) Date of Patent: Feb. 14, 2023

(54) VEHICLE DASHBOARD ASSEMBLY

(71) Applicant: YAMAHA HATSUDOKI KABUSHIKI KAISHA, Shizuoka (JP)

(72) Inventors: Kyle Aurelio Marietta, Newnan, GA (US); Zachary Lee Williams, Mableton, GA (US)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 535 days.

(21) Appl. No.: 16/523,457

(22) Filed: Jul. 26, 2019

(65) Prior Publication Data

US 2021/0023949 A1 Jan. 28, 2021

(51) Int. Cl.
*B60K 37/06* (2006.01)
*B60R 11/02* (2006.01)
*B60R 11/00* (2006.01)

(52) U.S. Cl.
CPC .......... *B60K 37/06* (2013.01); *B60R 11/0235* (2013.01); *B60R 2011/0005* (2013.01)

(58) Field of Classification Search
CPC ................. B60K 37/00; B60K 35/00
See application file for complete search history.

(56) References Cited

U.S. PATENT DOCUMENTS

| | | | | |
|---|---|---|---|---|
| 5,758,441 A * | 6/1998 | Law | ........................ | G09F 13/16 40/591 |
| 2005/0155049 A1* | 7/2005 | Lu | ........................ | B60R 11/0264 720/647 |
| 2007/0138822 A1* | 6/2007 | Feit | ........................ | B60K 35/00 296/70 |
| 2008/0174136 A1* | 7/2008 | Welschholz | .............. | B60R 7/06 296/37.12 |
| 2010/0103598 A1* | 4/2010 | Sakata | ................... | B60K 35/00 361/679.01 |
| 2010/0174477 A1* | 7/2010 | Ozaki | .................... | G01C 21/26 701/532 |
| 2014/0361569 A1 | 12/2014 | Crepaldi et al. | | |

* cited by examiner

*Primary Examiner* — Nan-Ying Yang
(74) *Attorney, Agent, or Firm* — Global IP Counselors, LLP

(57) ABSTRACT

A vehicle dashboard assembly includes a dashboard panel, a display support, a display and a display cover. The dashboard panel has a display receiving space. The display support is coupled to the dashboard panel. The display is removably and reinstallably attached to the display support. The display cover is movably coupled relative to the dashboard panel between a closed position and an open position. The display cover includes a first cover portion for covering a front side of the display and a second cover portion for covering one edge of the display. The first cover portion surrounds a screen of the display while in the closed position to define a display opening for viewing the screen. The first and second cover portions are movable as a unit between the closed and open positions.

19 Claims, 10 Drawing Sheets

VEHICLE DASHBOARD ASSEMBLY

BACKGROUND

Technical Field

The present invention generally relates to the field of recreational off-highway vehicles. More specifically, the present invention relates to a recreational off-highway vehicle having a display.

Background Information

Generally, recreational off-highway vehicles are designed to be operated on asphalt paths and/or dirt paths as well as off the paths. Basically, a recreational off-highway vehicle is considered to be any small vehicle that is not street legal. In other words, a recreational off-highway vehicle is not equipped and licensed for use on public roads, while a street legal vehicle is equipped and licensed for use on public roads. A recreational off-highway vehicle is capable of driving on paved and unpaved surfaces. These recreational off-highway vehicles are often driven on uneven terrain such as rough roads, steep inclines and steep declines. As a consequence of these considerations, the design of an off-highway vehicle can be quite different from vehicles designed for driving solely on paved roads. In the case of small off-highway vehicles other than motorcycles, these small off-highway vehicles are designed to be primarily driven on unpaved surfaces and typically has only one seat, two seats or four seats.

SUMMARY

Generally, the present disclosure is directed to various features of a recreational off-highway vehicle. Recreational off-highway vehicles typically have an open passenger compartment that is exposed to the weather. Thus, a vehicle dashboard assembly of a recreational off-highway vehicle is also exposed to the weather. In view of this situation, one feature of the present disclosure is to provide vehicle dashboard assembly that has a removable display.

In view of the state of the known technology and in accordance with one aspect of the present disclosure, a vehicle dashboard assembly is provided that basically comprises a dashboard panel, a display support, a display and a display cover. The dashboard panel has a display receiving space. The display support is coupled to the dashboard panel. The display is removably and reinstallably attached to the display support. The display cover is movably coupled relative to the dashboard panel between a closed position and an open position. The display cover includes a first cover portion for covering a front side of the display and a second cover portion for covering one edge of the display. The first cover portion surrounds a screen of the display while in the closed position to define a display opening for viewing the screen. The first and second cover portions are movable as a unit between the closed and open positions.

With the off-highway vehicle according to this aspect, it is possible to integrate center console display with the dashboard such that the display can be easily removed as needed and/or desired.

In accordance with another aspect of the present disclosure, a vehicle is provided that basically comprises a vehicle frame and a vehicle dashboard assembly. The vehicle frame defines a passenger compartment. The vehicle dashboard assembly is provided to the passenger compartment. The vehicle dashboard assembly includes a dashboard panel, a display support, a display and a display cover. The dashboard panel has a display receiving space. The display support is coupled to the dashboard panel. The display is removably and reinstallably attached to the display support. The display cover is movably coupled relative to the dashboard panel between a closed position and an open position. The display cover includes a first cover portion for covering a front side of the display and a second cover portion for covering one edge of the display. The first cover portion surrounds a screen of the display while in the closed position to define a display opening for viewing the screen. The first and second cover portions are movable as a unit between the closed and open positions.

Also, other objects, features, aspects and advantages of the disclosed vehicle dashboard assembly will become apparent to those skilled in the art from the following detailed description, which, taken in conjunction with the annexed drawings, discloses preferred embodiments of the vehicle dashboard assembly.

BRIEF DESCRIPTION OF THE DRAWINGS

Referring now to the attached drawings which form a part of this original disclosure.

Figure 1:
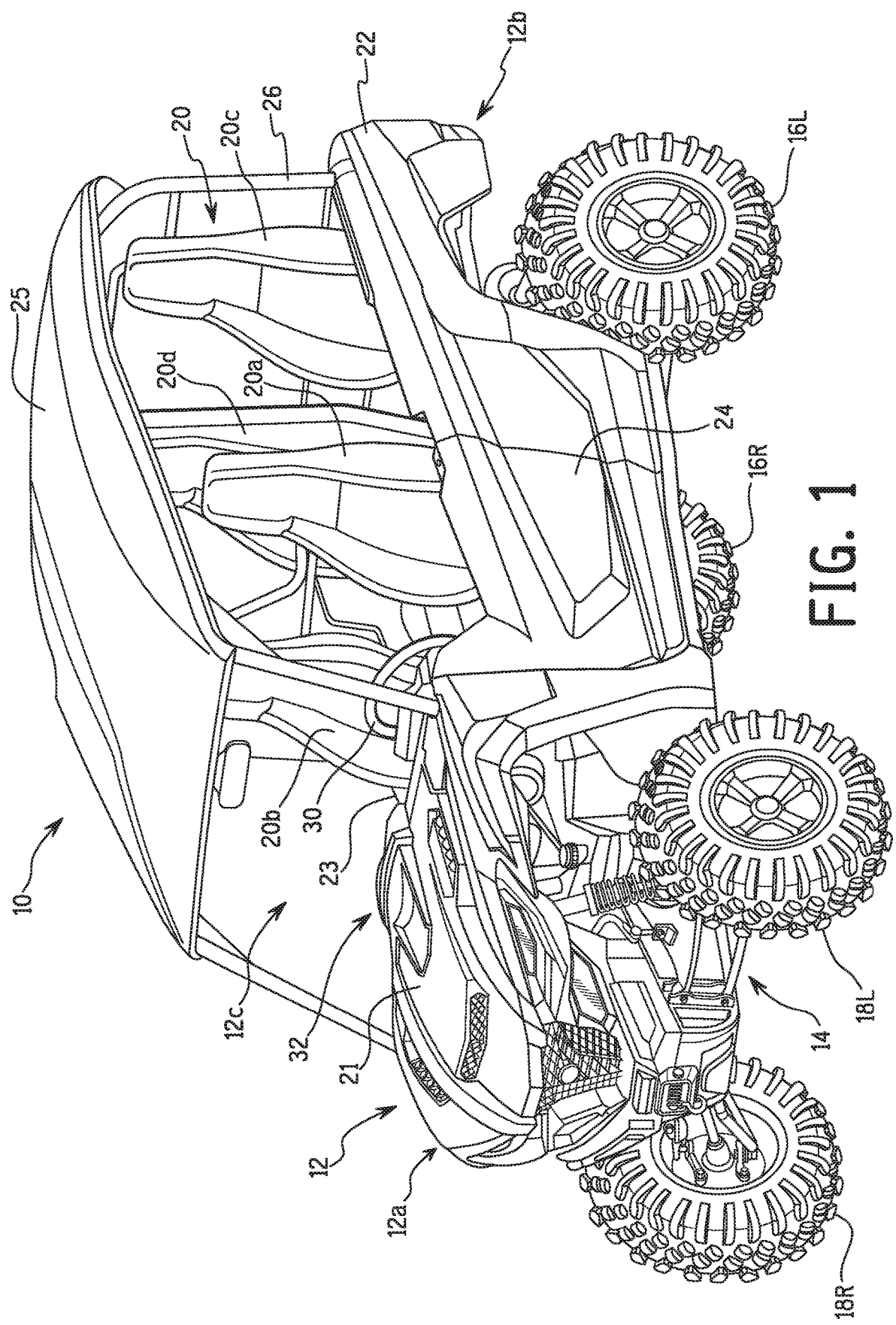
FIG. 1 is a front perspective view of a vehicle provided with a vehicle dashboard assembly in accordance with one illustrative embodiment.

It should be noted that these figures are intended to illustrate the general characteristics of methods, structure and/or materials utilized in certain illustrative embodiment and to supplement the written description provided below. These figures are to reduce scale of the actual off-highway vehicle but may not precisely reflect the precise structural or performance characteristics of any given embodiment. However, the dimensional relationships and the arrangement of the parts of the off-highway vehicle are accurately depicted.

DETAILED DESCRIPTION OF EMBODIMENTS

Selected embodiments will now be explained with reference to the drawings. It will be apparent to those skilled in the off-highway vehicle field from this disclosure that the following descriptions of the embodiments are provided for illustration only and not for the purpose of limiting the invention as defined by the appended claims and their equivalents. Like reference numerals in the drawings denote like similar or identical elements or features, and thus the descriptions of the similar or identical elements or features may be omitted in later embodiments.

Referring initially to FIG. 1, a vehicle 10 is illustrated in accordance with one illustrative embodiment. Here, the vehicle 10 is a recreational off-highway vehicle. As used herein, the term "recreational off-highway vehicle" refers to a vehicle that is not street legal (i.e. the off-highway vehicle is not equipped and licensed for use on public road). In other words, in the illustrated embodiment, the vehicle 10 can be classified as a "recreational off-highway vehicle". Generally, as used herein, the term "off-highway vehicle" refers to a vehicle designed for driving on unpaved and uneven surfaces. Of course, off-highway vehicles such as the vehicle 10 illustrated herein can be also driven on paved surfaces such as golf paths The off-highway vehicle 10 basically comprises a vehicle body 12. Here, the vehicle body 12 is supported on a vehicle frame 14. Alternatively, the vehicle body 12 can have a unibody construction in which the vehicle frame is integrated into the vehicle body 12. The off-highway vehicle 10 further comprises a pair of rear wheels 16R and 16L, a pair of front wheels 18R and 18L and a plurality of (four in FIG. 1) seats 20. Also, in some applications of the off-highway vehicle 10, only three wheels can be provided instead of four wheels as in the illustrated embodiment. In any case, the off-highway vehicle 10 includes at least three wheels. Also, in some applications of the off-highway vehicle 10, only one or two seats can be provided instead of four seats as illustrated embodiment. In any case, the off-highway vehicle 10 includes at least one seat. The off-highway vehicle 10 further comprises many other conventional vehicle components, such as an electric motor or an internal combustion engine, an accelerator pedal, a brake system, etc. that are typically provided on off-highway vehicles. However, for the sake of brevity, only those vehicle components needed to understand the present invention will be illustrated and/or discussed herein.

As shown in FIG. 1, the vehicle body 12 has a front portion 12a, a rear portion 12b and a passenger compartment 12c. The passenger compartment 12c is between the front and rear portions 12a and 12b. Specifically, the vehicle body 12 basically includes a front cover panel 21, a rear cover panel 22, a right-side door panel 23, a left-side door panel 24, and a roof panel 25. The front cover panel 21 covers a front portion of the vehicle frame 14 and basically defines the front portion 12a of the vehicle body 12. The rear cover panel 22 covers a rear portion of the vehicle frame 14 and basically defines the rear portion 12b of the vehicle body 12. The rear cover panel 22 also partially covers a middle portion of the vehicle frame 14 and partially defines the passenger compartment 12c of the vehicle body 12. The right-side door panel 23 and the left-side door panel 24 partially cover the middle portion of the vehicle frame 14 and partially defines the passenger compartment 12c of the vehicle body 12. The body panels 21 to 25 can be separate panels that are removable with respect to each other. Alternatively, the body panels 21 to 25 can be integrally formed to be non-removable with respect to each other. The body panels 21 to 25 are constructed of suitable rigid materials that are typically used in manufacturing an off-highway vehicle.

In the illustrated embodiment, the vehicle frame 14 of the off-highway vehicle 10 includes a roll cage 26 that supports the roof panel 25. The roll cage 26 is fixedly attached to a base frame (not shown) of the vehicle frame 14 to define the passenger compartment 12c of the vehicle body 12.

In the illustrated embodiment, the seats 20 are bucket seats. The seats 20 are disposed on the vehicle body 12 in the passenger compartment 12c. The seats 20 include a pair of front seats 20a and 20b and a pair of rear seats 20c and 20d. In the illustrated embodiment, the front seat 20a is a driver's seat, while the front seat 20b is a front passenger or assistant driver's seat. Alternatively, the seats 20 can include different types of seat, such as a bench seat.

The off-highway vehicle 10 further comprises a steering wheel 30 operatively connected to the front wheels 18R and 18L by a steering column (not shown) for turning the front wheels 18R and 18L in a conventional manner. The steering column extends into the passenger compartment 12c and supports the steering wheel 30. Thus, the steering wheel 30 is disposed in the passenger compartment 12c.

The off-highway vehicle 10 further comprises a dashboard assembly 32 (e.g., a vehicle dashboard assembly). The dashboard assembly 32 is provided to the passenger compartment 12c. Specifically, the dashboard assembly 32 is attached to the front portion 12a of the vehicle body 12 in front of the front seats 20a and 20b. The dashboard assembly 32 is attached to the front cover panel 21 and extends rearwardly into the passenger compartment 12c. The dashboard assembly 32 is spaced forward of the front seats 20a and 20b. In the illustrated embodiment, the dashboard assembly 32 laterally extend between the right-side door panel 23 and the left-side door panel 24. In particular, the dashboard assembly 32 laterally extend from a location directly ahead of the front seat 20a to a location directly ahead of the front seat 20b.

Referring now to FIGS. 2 to 12, the configuration of the dashboard assembly 32 will be described in detail.

In the illustrated embodiment, the dashboard assembly 32 comprises a dashboard 34 (e.g., dashboard panel), a driver side display 36 and a center console display 38.

The driver side display 36 is integrated with the dashboard 34. Specifically, the driver side display 36 is installed at a driver side display receiving space 34a of the dashboard 34. The driver side display 36 is located directly ahead of the front seat 20a such that a driver of the off-highway vehicle 10 can see a screen 36a of the driver side display 36. The driver side display 36 displays various vehicle conditions by showing a speedometer, a tachometer, an odometer, an engine coolant temperature gauge, a fuel gauge, a gearshift position indicator, and the like on the screen 36a. Of course, the driver side display 36 can display other types of information as needed and/or desired.

Figure 2:
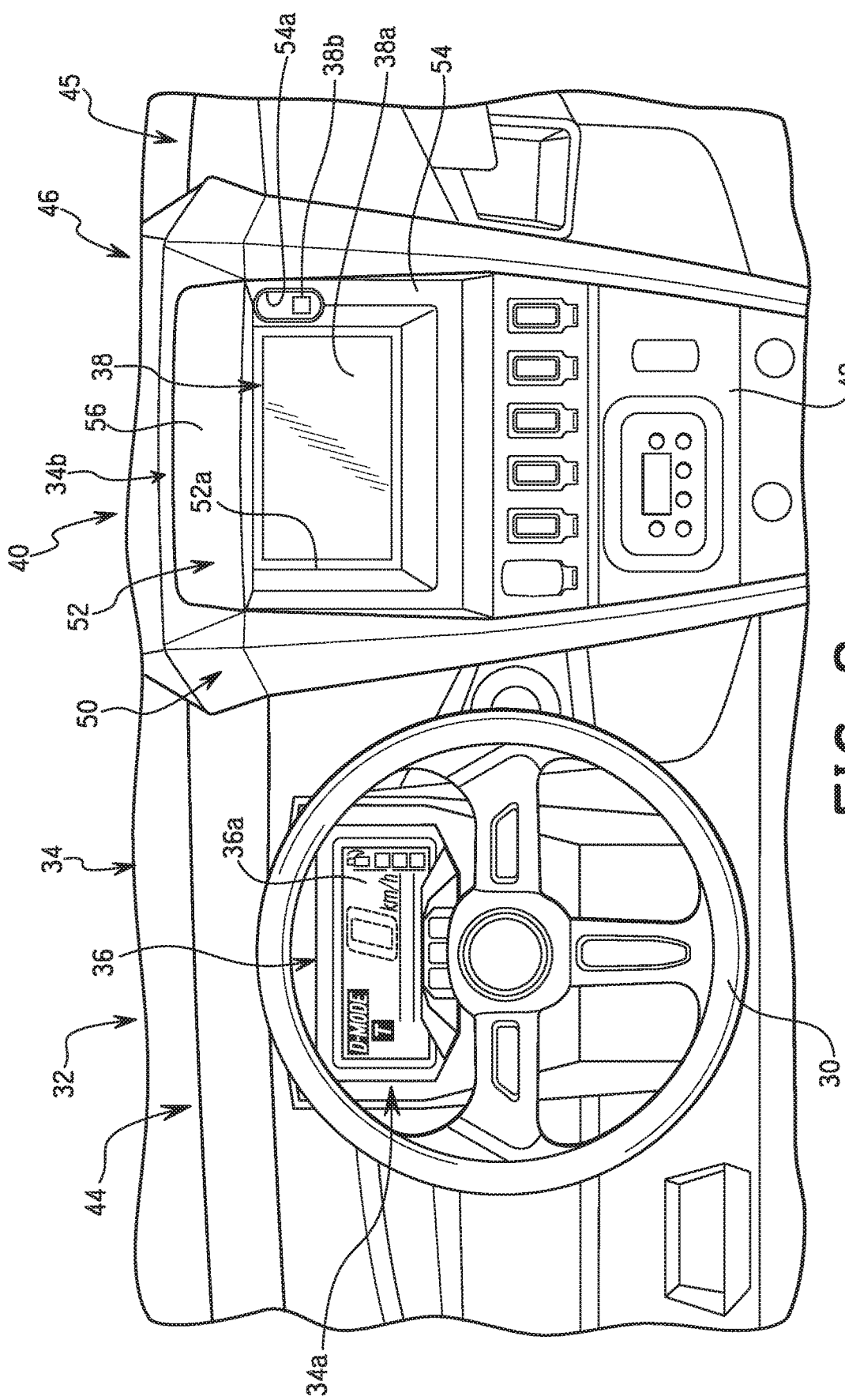
FIG. 2 is a partial front oblique view of the vehicle dashboard assembly of the vehicle illustrated in FIG. 1 in which the vehicle includes a driver side display and a center console display.
Figure 6:
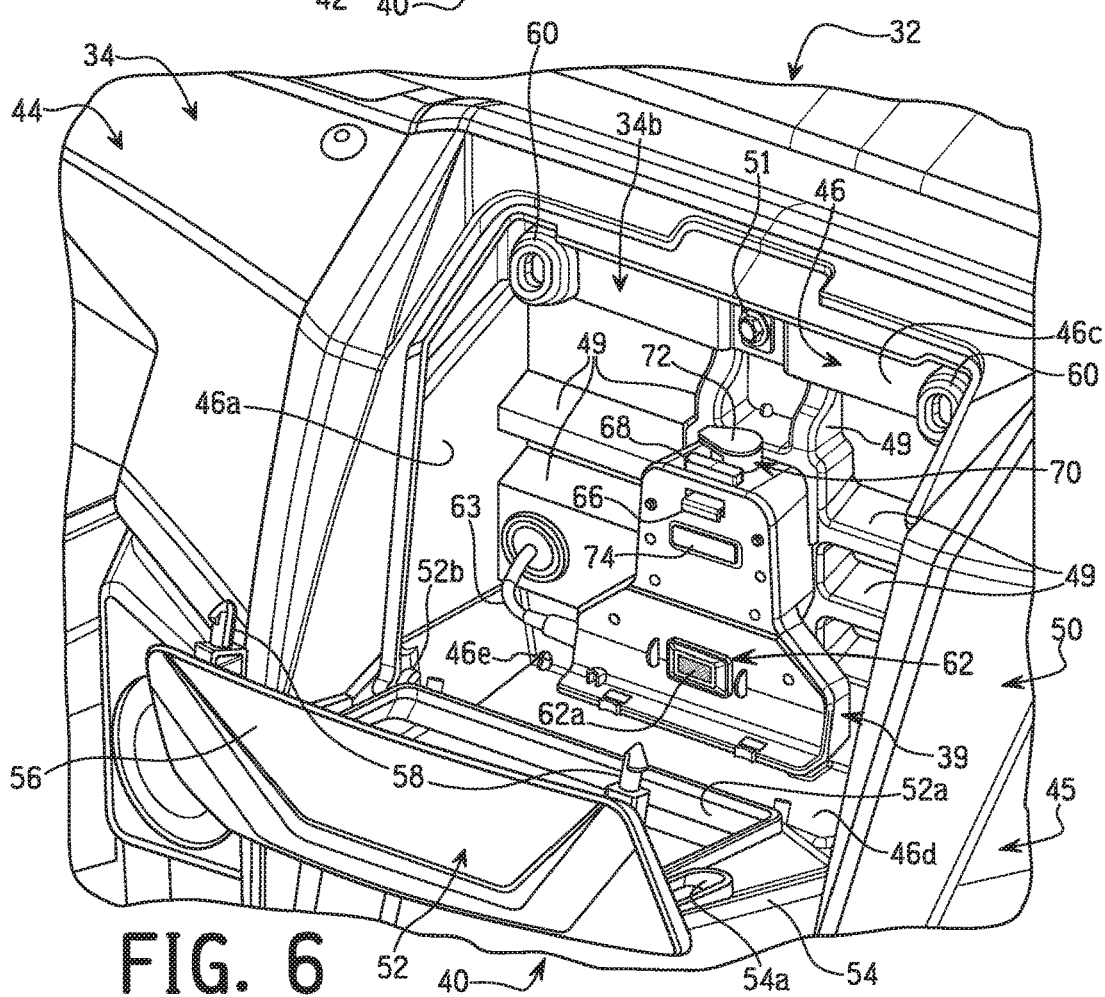
FIG. 6 is a perspective view, similar to FIG. 5, of the center portion of the vehicle dashboard assembly illustrated in FIGS. 2 to 5, but with the center console display removed to reveal a display support having power and data connections.

The center console display 38 is removably and reinstallably attached to the dashboard 34. In the illustrated embodiment, the center console display 38 is installed at a center console display receiving space 34b (e.g., a display receiving space) of the dashboard 34. Specifically, as shown in FIG. 6, the dashboard assembly 32 further comprises a display support 39 coupled to the dashboard 34, and the center console display 38 is removably and reinstallably attached to the display support 39. The center console display 38 is located at a center portion of the dashboard 34, and is laterally spaced apart from the driver side display 36, as shown in FIG. 2. Specifically, in the illustrated embodiment, the center console display 38 is laterally located between the front seats 20a and 20b such that a driver or a passenger of the off-highway vehicle 10 can see a screen 38a of the center console display 38. The center console display 38 displays various information for vehicle climate controls, lighting controls, safety systems, entertainment systems, navigation systems, and the like on the screen 38a. The center console display 38 can also display various vehicle conditions (e.g., at least one vehicle condition). Of course, the center console display 38 can display other types of information as needed and/or desired. In the illustrated embodiment, the center console display 38 has a control switch 38b adjacent to the screen 38a. In the illustrated embodiment, the control switch 38b is a power switch to turn on/off the center console display 38, for example.

In the illustrated embodiment, the center console display 38 forms a part of a center console 40 of the off-highway vehicle 10. The center console 40 further comprises a dash switch panel 42 that accommodates rocker switches for controlling various accessories installed to the off-highway vehicle 10. The dash switch panel 42 can also accommodate an auxiliary power outlets, an entertainment equipment, and the like as needed and/or desired.

Figure 9:
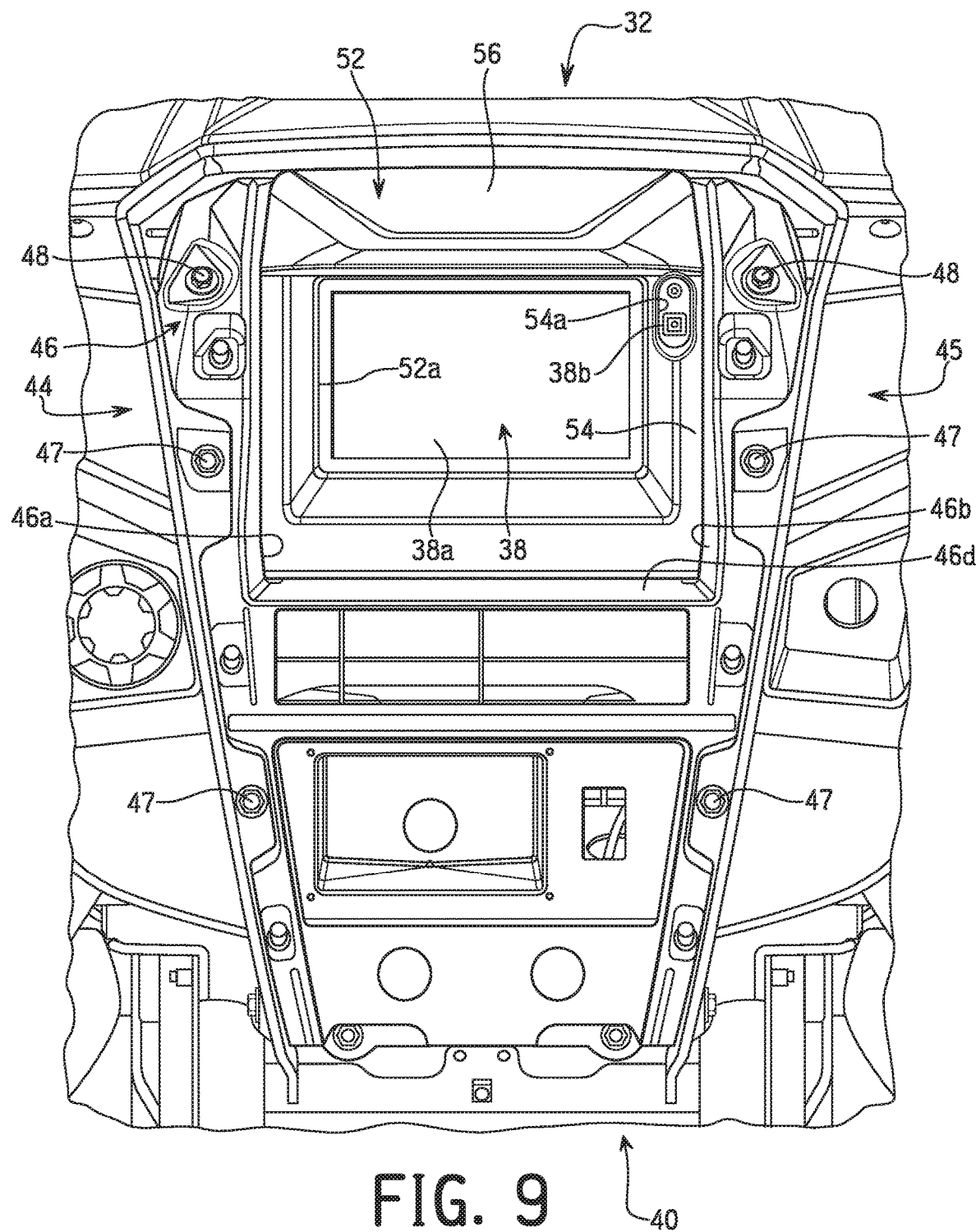
FIG. 9 is a partial front oblique view, similar to FIG. 3, of the center portion of the vehicle dashboard assembly illustrated in FIGS. 2 to 8 but with a center console panel removed to show the dashboard panel.
Figure 10:
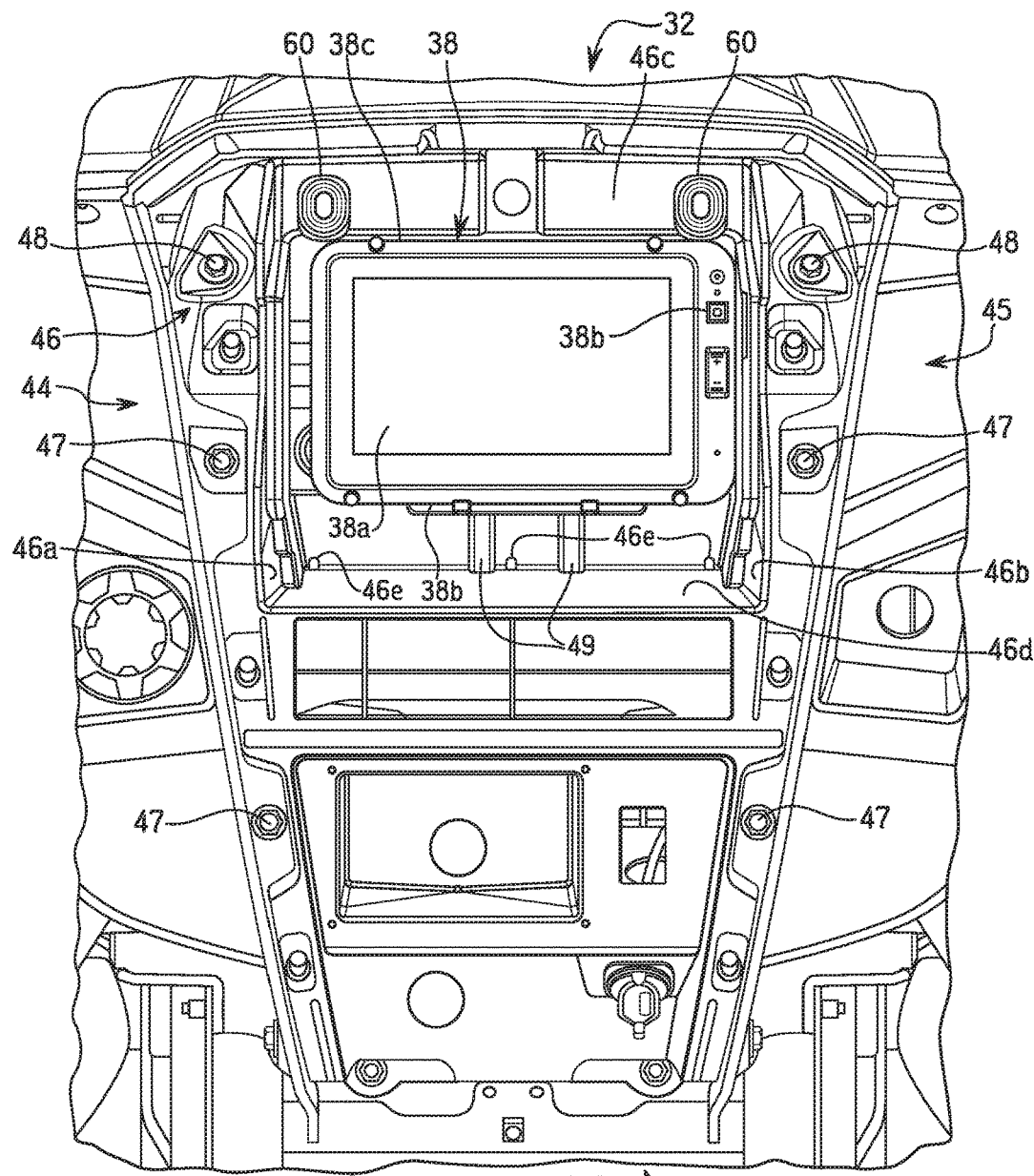
FIG. 10 is a partial front oblique view, similar to FIG. 9, of the center portion of the vehicle dashboard assembly illustrated in FIGS. 2 to 8 but with the display cover also removed to show more of the dashboard panel.

In the illustrated embodiment, the dashboard 34 includes a left-side dashboard panel 44, a right-side dashboard panel 45 and a center dashboard panel 46. The left-side dashboard panel 44 is located directly ahead of the front seat 20a, and includes the driver side display receiving space 34a to accommodate the driver side display 36. The right-side dashboard panel 45 is located directly ahead of the front seat 20b. The left-side dashboard panel 44 and the right-side dashboard panel 45 laterally extend outward from the center dashboard panel 46, respectively. The center dashboard panel 46 is laterally located between the left-side dashboard panel 44 and the right-side dashboard panel 45, and includes the center console display receiving space 34b to accommodate the center console display 38. The dashboard panels 44 to 46 are preferably rigid plastic members that are injection molded. Thus, in the illustrated embodiment, the dashboard panels 44 to 46 are each formed as a one-piece, unitary member. In the illustrated embodiment, the left-side and right-side dashboard panels 44 and 45 are removably attached to the center dashboard panel 46. Preferably, as shown in FIGS. 9 and 10, the left-side and right-side dashboard panels 44 and 45 are removably attached to the center dashboard panel 46 by a plurality of (four in FIGS. 9 and 10) screws 47. Alternatively, the dashboard panels 44 to 46 can be integrally formed as a one-piece, unitary member. In the illustrated embodiment, the dashboard 34 is removably attached to the vehicle frame 14. More specifically, as shown in FIGS. 9 to 12, the center dashboard panel 46 of the dashboard 34 is removably attached to a pair of support beam 14a of the vehicle frame 14 by a plurality of bolts 48. With this arrangements, in the illustrated embodiment, the dashboard assembly 32 is fixedly supported by the vehicle frame 14.

In the illustrated embodiment, the center dashboard panel 46 includes a pair of side walls 46a and 46b, a back wall 46c and a bottom wall 46d. The side walls 46a and 46b, the back wall 46c and the bottom wall 46d define the center console display receiving space 34b. The side walls 46a and 46b laterally face opposite relative to each other. The back wall 46c laterally extends between the side walls 46a and 46b. The back wall 46c has a plurality of reinforcing ribs 49. Specifically, the reinforcing ribs 49 are located adjacent to the display support 39 to fixedly support the display support 39 relative to the center dashboard panel 46.

Figure 7:
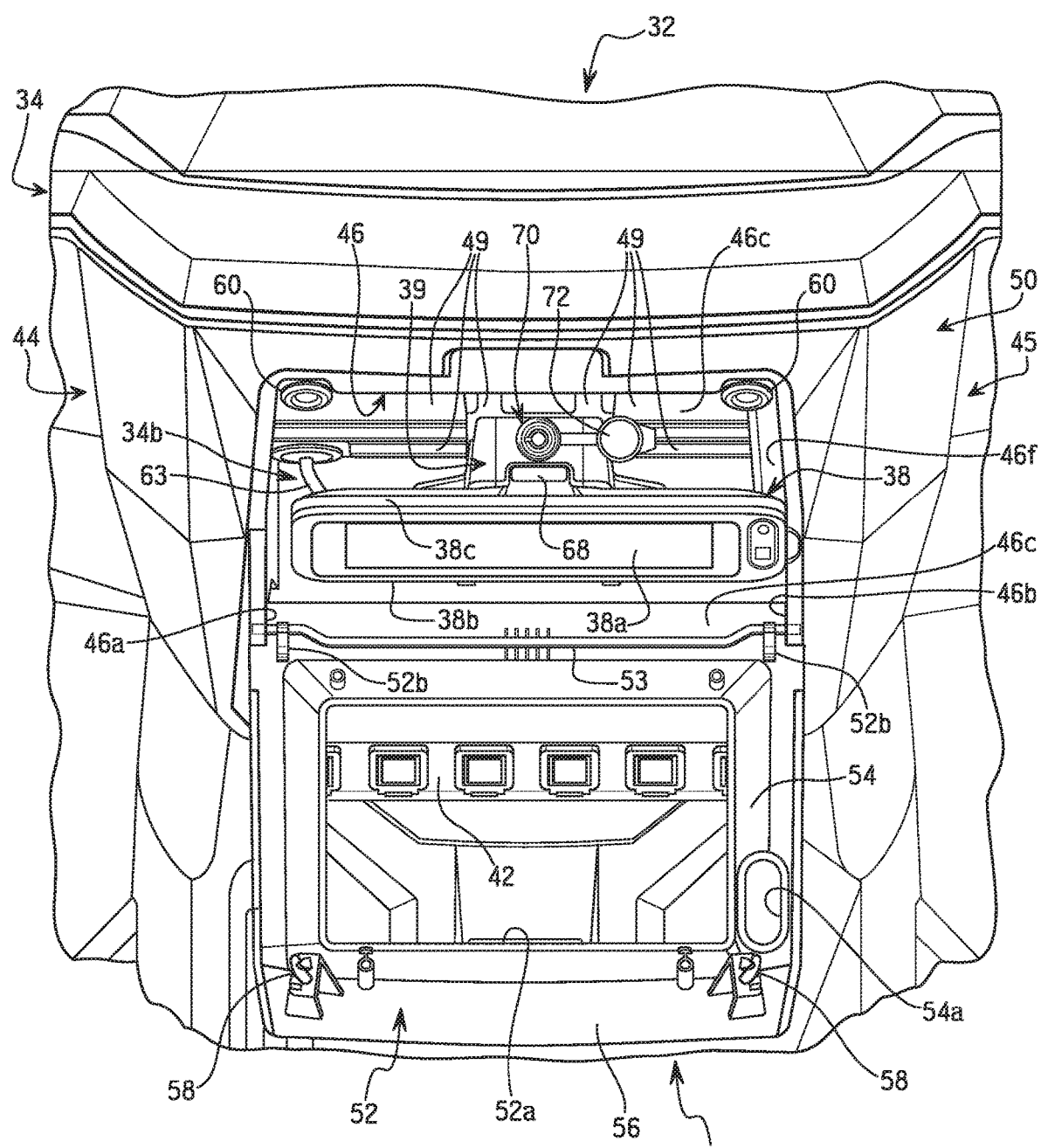
FIG. 7 is a top partial oblique view of the center portion of the vehicle dashboard assembly illustrated in FIGS. 2 to 6 in which the display cover has been pivoted to the open position as shown in FIG. 5.
Figure 11:
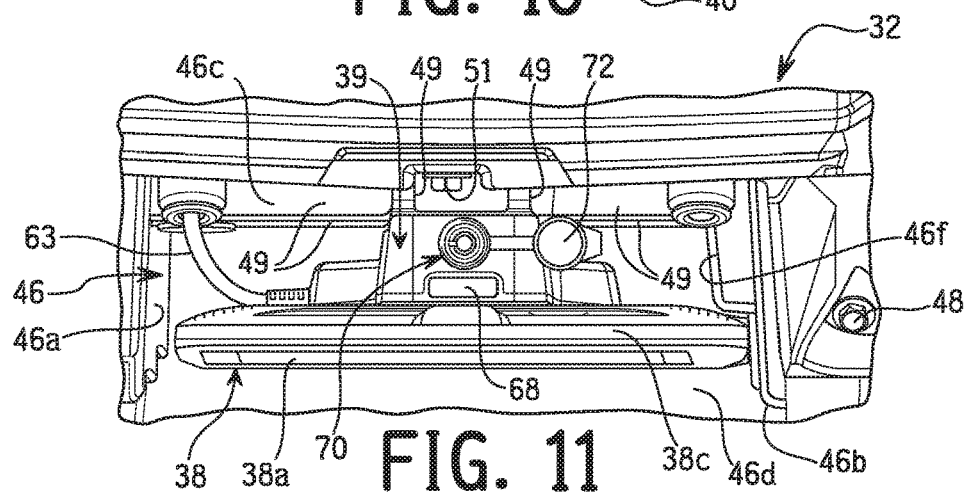
FIG. 11 is a top partial oblique view of the center portion of the vehicle dashboard assembly illustrated in FIGS. 2 to 10 in which the center console panel and the display cover have been removed to show the dashboard panel.
Figure 12:
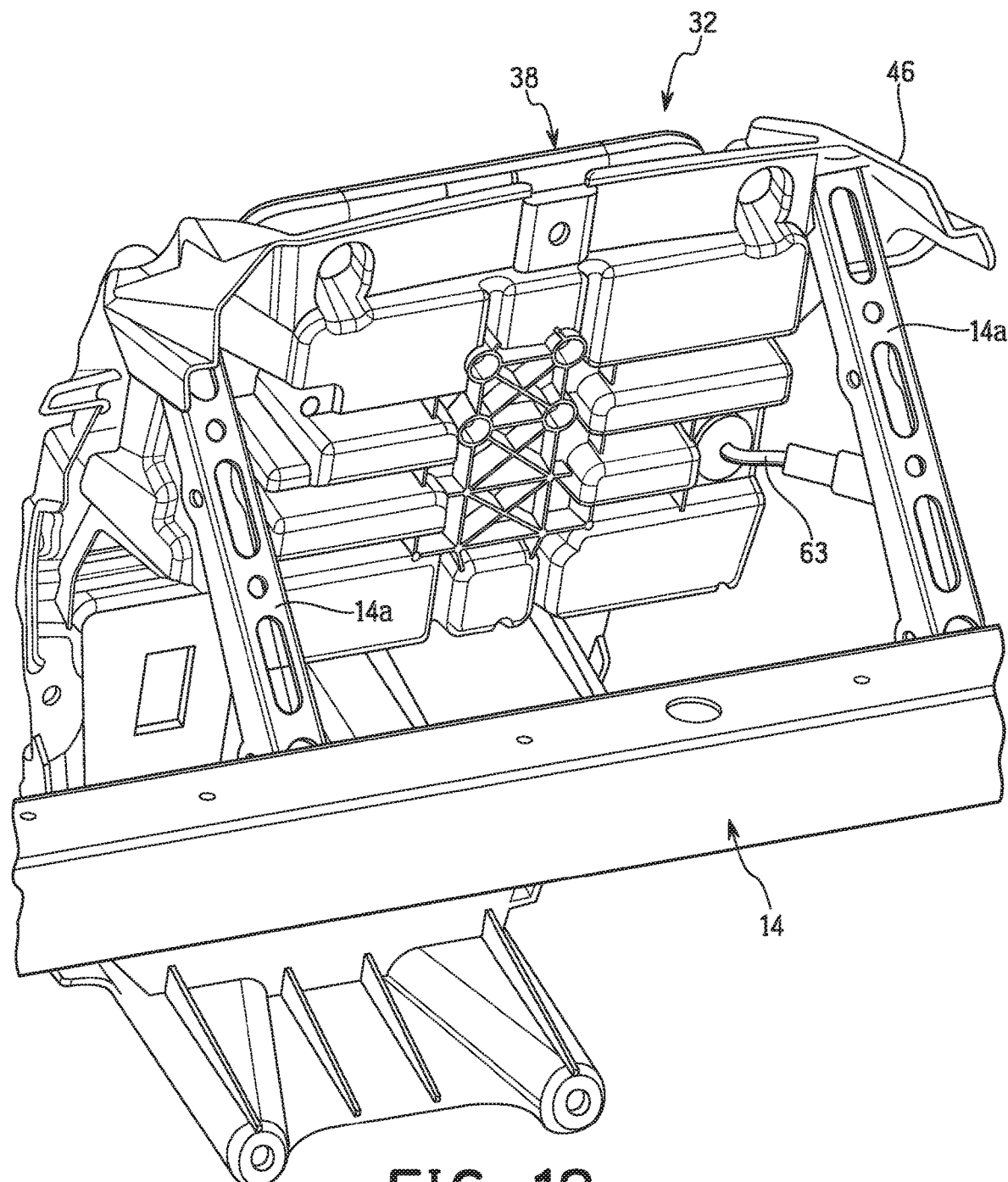
FIG. 12 is a rear side perspective view of the dashboard panel of the vehicle dashboard assembly.

In the illustrated embodiment, the center dashboard panel 46 also includes a plurality of (three in FIG. 10) drain openings 46e. Specifically, the drain openings 46e are arranged along a corner between the back wall 46c and the bottom wall 46d to drain water inside the center console display receiving space 34b. Furthermore, the center dashboard panel 46 includes a support abutment 46f. Specifically, the support abutment 46f is arranged at a corner between the back wall 46c and the side wall 46b, and extending away from the back wall 46c toward the center console display 38. In particular, as shown in FIGS. 7 and 11, the support abutment 46f is laterally spaced from the display support 39 to support a portion corresponding to the control switch 38b of the center console display 38 from a back side of the center console display 38. Specifically, in the illustrated embodiment, the support abutment 46f is disposed spaced apart from the center console display 38 when the control switch 38b is not pressed. On the other hand, the support abutment 46f contacts with the portion corresponding to the control switch 38b of the center console display 38 from the back side of the center console display 38 when the control switch 38b is pressed. Alternatively, the support abutment 46f can be arranged to contact with the center console display 38 even when the control switch 38b is not pressed.

Here, the dashboard assembly 32 comprises a center console panel 50 (e.g., a trim panel). The center console panel 50 is preferably a rigid plastic member that is injection molded. In the illustrated embodiment, the center console panel 50 is a one-piece, unitary member. The center console panel 50 is attached to the center dashboard panel 46 and surrounds the center console display receiving space 34b. Specifically, the center console panel 50 is removably attached to the center dashboard panel 46 by a screw 51. The center console panel 50 covers edges of the center console 40 to cover the screws 48 and the bolts 49.

The dashboard assembly 32 also comprises a display cover 52. The display cover 52 is preferably a rigid plastic member that is injection molded. In the illustrated embodiment, the display cover 52 is a one-piece, unitary member. The display cover 52 is movably coupled relative to the center dashboard panel 46 of the dashboard 34 between a closed position shown in FIGS. 2 to 4 and 8 and an open position shown in FIGS. 5 to 7. Specifically, the display cover 52 is pivotally mounted relative to the center dashboard panel 46. In particular, as shown in FIG. 7, the display cover 52 is pivotally mounted relative to the center dashboard panel 46 by mating a pair of clip portions 52b of the display cover 52 with a pivot rod 53 that is attached to the center dashboard panel 46. In the illustrated embodiment, the pivot rod 53 is supported between the side walls 46a and 46b of the center dashboard panel 46 adjacent to a bottom edge 38b of the center console display 38. Thus, the display cover 52 is pivotally mounted relative to the center dashboard panel 46 adjacent to the bottom edge 38b of the center console display 38.

Figure 4:
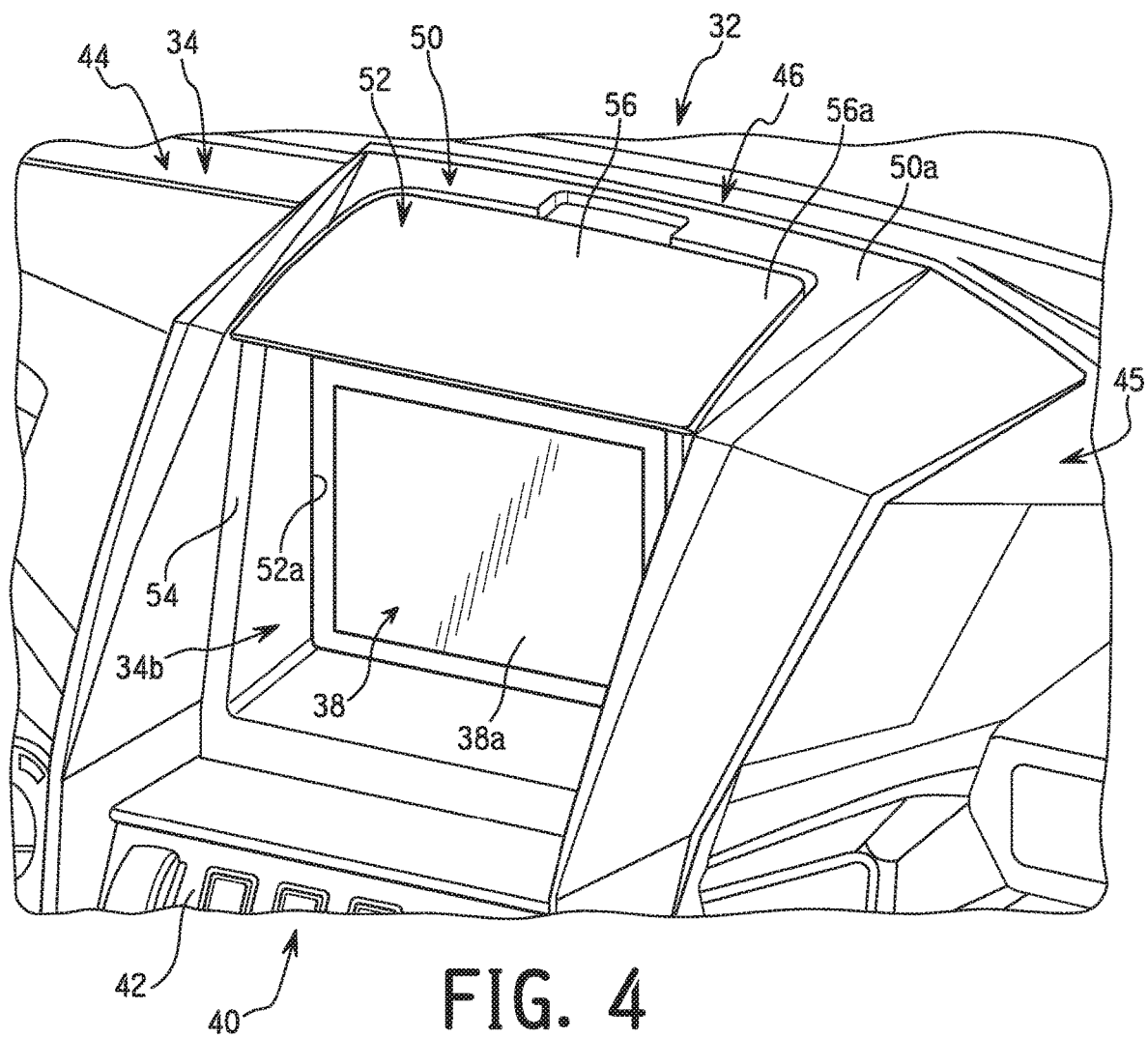
FIG. 4 is a perspective view of the center portion of the vehicle dashboard assembly illustrated in FIGS. 2 and 3.

The display cover 52 includes a front cover portion 54 (e.g., a first cover portion) for covering a front side of the center console display 38, and a top cover portion 56 (e.g., a second cover portion) for covering a top edge 38c (e.g., one edge) of the center console display 38. Specifically, as shown in FIG. 4, the front cover portion 54 surrounds the screen 38a of the center console display 38 while the display cover 52 is positioned in the closed position to define a display opening 52a for viewing the screen 38a therethrough. The front and top cover portions 54 and 56 are movable as a unit between the closed and open positions.

Figure 3:
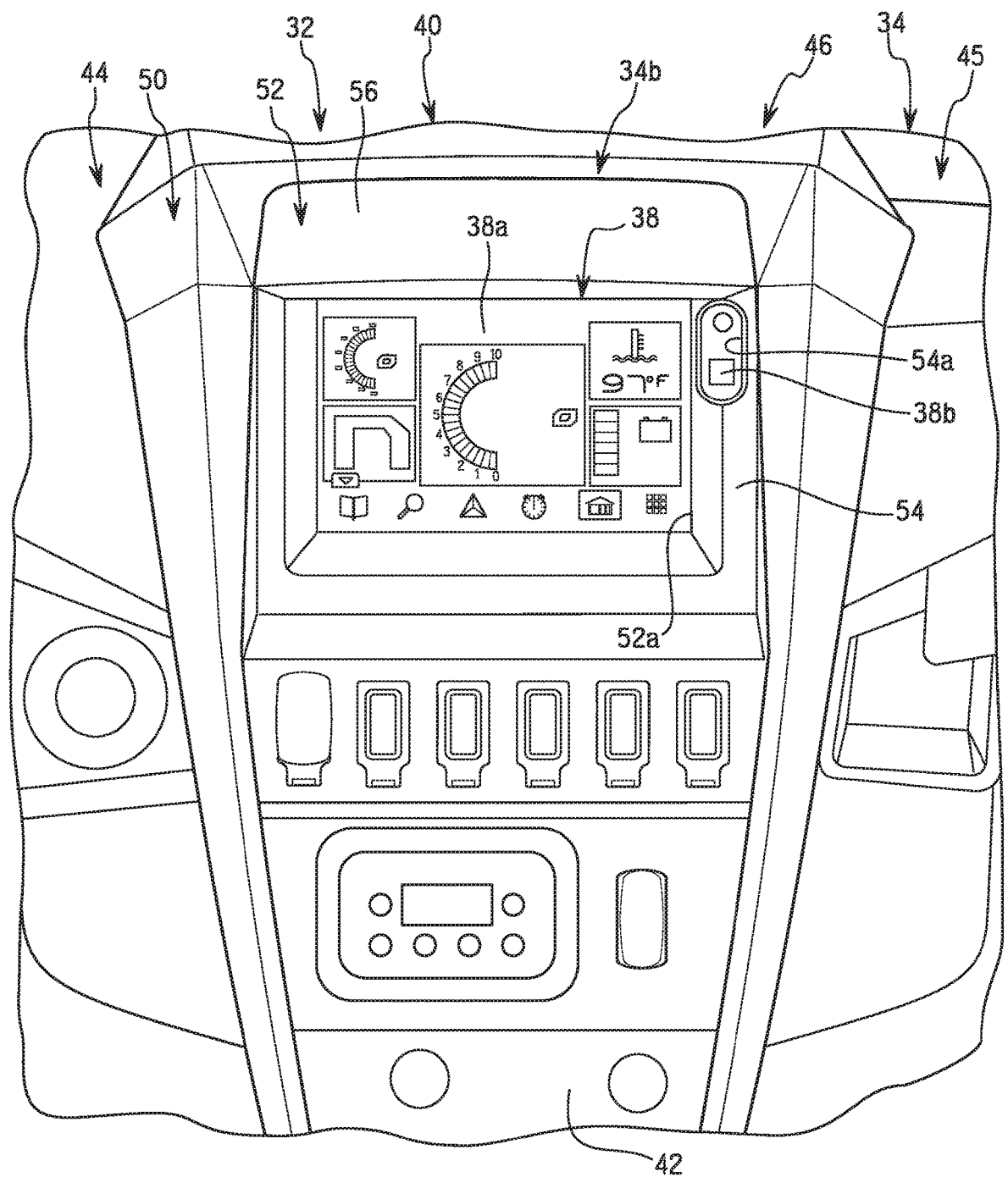
FIG. 3 is a partial front oblique view of a center portion of the vehicle dashboard assembly illustrated in FIG. 2.

As shown in FIG. 3, the front cover portion 54 includes an auxiliary opening 54a. Specifically, the front cover portion 54 includes the auxiliary opening 54a at a location corresponding to the control switch 38b of the center console display 38. In particular, the control switch 38b is accessible through the auxiliary opening 54a while the display cover 52 is positioned in the closed position as shown in FIG. 3. When the control switch 38b is operated while the display cover 52 is positioned in the closed position, the support abutment 46f of the center dashboard panel 46 supports the portion corresponding to the control switch 38b of the center console display 38 from the back side of the center console display 38. In other words, in the illustrated embodiment, the center console display 38 includes the control switch 38b in an area of the support abutment 46f.

Figure 8:
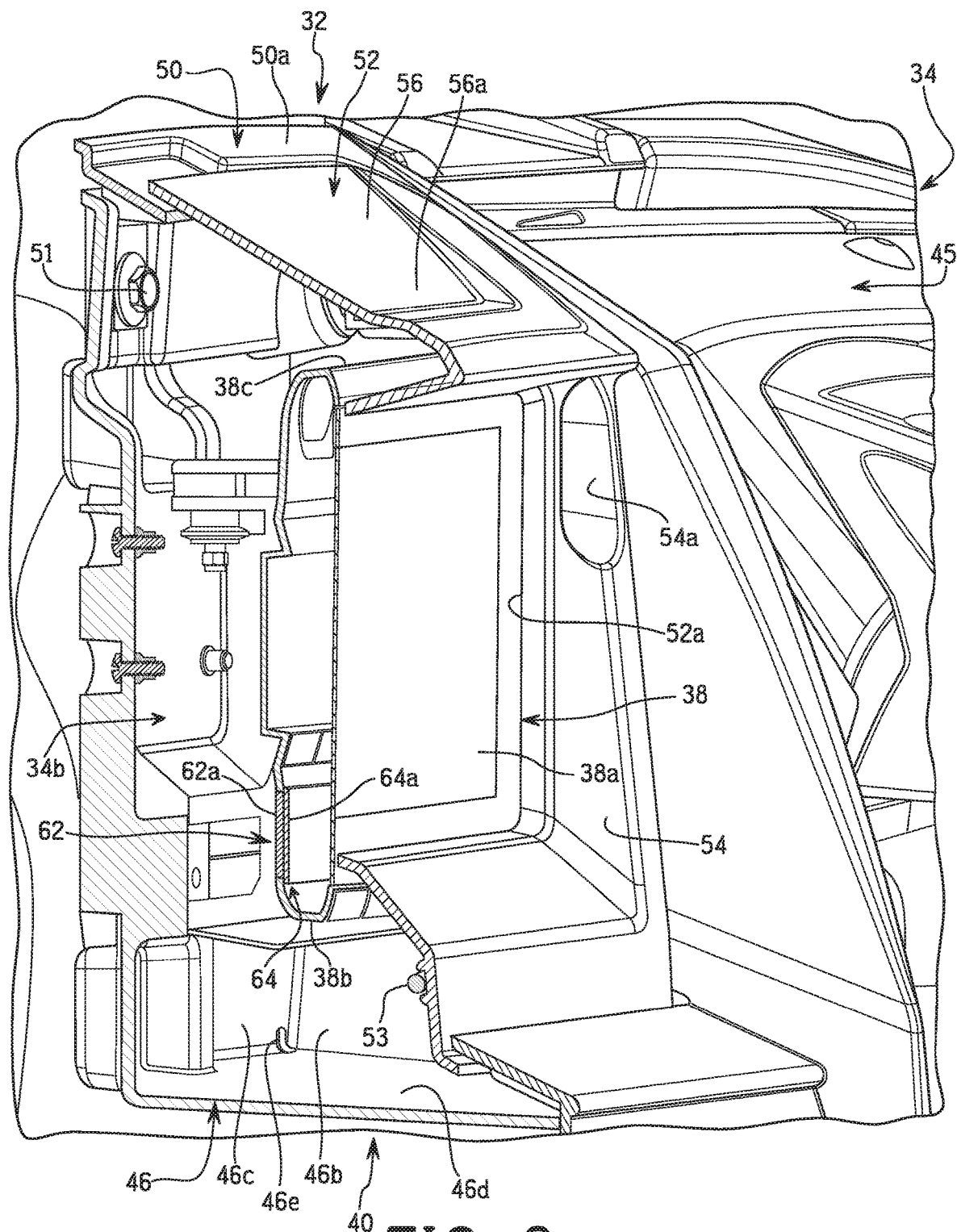
FIG. 8 is a cross sectional view of the center portion of the vehicle dashboard assembly illustrated in FIGS. 2 to 7 with the display cover in the closed position as shown in FIG. 4.

As shown in FIG. 8, the top cover portion 56 includes a visor overhanging the display opening 52a of the display cover 52. The top cover portion 56 forms a top or upper surface of the center console 40 with the center console panel 50. Specifically, as shown in FIGS. 4 and 8, a top surface 56a of the top cover portion 56 and the top surface 50a of the center console panel 50 forms the top surface of the center console 40. In the illustrated embodiment, the top surface 56a of the top cover portion 56 forms a continuous surface with the top surface 50a of the center console panel 50. Specifically, as shown in FIGS. 4 and 8, the top surface 56a of the top cover portion 56 forms a continuous surface with the top surface 50a of the center console panel 50 while the display cover 52 is positioned in the closed position.

Figure 5:
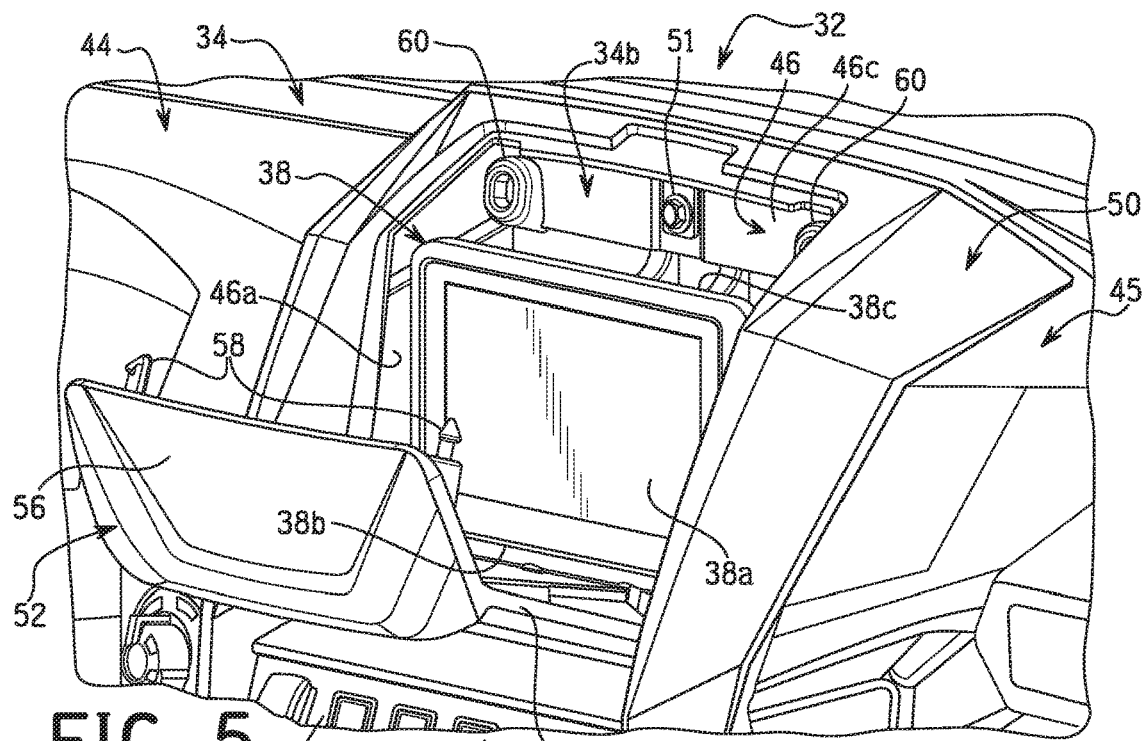
FIG. 5 is a perspective view, similar to FIG. 4, of the center portion of the vehicle dashboard assembly illustrated in FIGS. 2 to 4, but with a display cover of the vehicle dashboard assembly pivoted from a closed position shown in FIG. 4 to an open position.

Furthermore, as shown in FIGS. 5 to 7, the display cover 52 has a pair of snap-fit joints or connections 58 that mates with the center dashboard panel 46 while the display cover 52 is positioned in the closed position. Specifically, in the illustrated embodiment, the snap-fit connections 58 include hooks that are formed on the top cover portion 56. The snap-fit connections 58 are inserted into holes of grommets 60 that are attached to the center dashboard panel 46 while the display cover 52 moves from the open position to the closed position, and mate with the grommets 60 to keep the display cover 52 in the closed position. Alternatively, the snap-fit connections 58 can directly mate with openings of the center dashboard panel 46.

In the illustrated embodiment, as shown in FIGS. 5 to 8, the center console display 38 is removably and reinstallably attached to the display support 39. The display support 39 is fixedly attached to the center dashboard panel 46 within the center console display receiving space 34b. Specifically, the display support 39 is fixedly attached on the reinforcing ribs 49. The display support 39 is also disposed above the bottom wall 46d. The display support 39 includes an electrical connector 62 having a set of electrical contacts 62a (e.g., first electrical contacts). The electrical connector 62 supplies the power to the center console display 38 from a battery of the off-highway vehicle 10 when the center console display 38 is attached to the display support 39. The electrical connector 62 also transmits data from various sensors of the off-highway vehicle 10 to the center console display 38 via an ECU of the off-highway vehicle 10, for example, when the center console display 38 is attached to the display support 39. The electrical connector 62 can also transmit data, such as setting data, from the center console display 38 to the ECU of the off-highway vehicle 10. Specifically, as shown in FIG. 6, the electrical connector 62 is electrically connected to the battery, sensors and ECU of the off-highway vehicle 10 via an electric wiring 63. As shown in FIG. 8, the center console display 38 includes an electrical connector 64 having a set of electrical contacts 64a (e.g., second electrical contacts). The electrical contacts 64a of the center console display 38 mate with the electrical contacts 62a of the display support 38 when the center console display 38 is attached to the display support 39.

As shown in FIG. 6, the display support 39 further includes a latch 66. In the illustrated embodiment, the latch 66 is engaged to a recess disposed on a casing of the center console display 38, and holds the center console display 38 relative to the display support 39. The display support 39 also includes a release mechanism 68 for releasing the engagement of the latch 66 relative to the center console display 38 to release the center console display 38 from the display support 39. Thus, in the illustrated embodiment, the center console display 38 is releasably coupled to the display support 39 by the latch 66.

As shown in FIGS. 6, 7 and 11, the display support 39 further includes a key lock 70 for locking the center console display 38 relative to the dashboard 34. Specifically, in the illustrated embodiment, the key lock 70 can lock the movement of the release mechanism 68 such that the center console display 38 is not released from the display support 39 when the center console display 38 is attached to the display support 39. In the illustrated embodiment, a key is used to unlock the key lock 70. This key can be a vehicle key or a key other than a vehicle key. Alternatively, the display support 39 can include different types of locks from the key lock 70. In the illustrated embodiment, a cap 72 is attached to the key lock 70 for waterproof purpose. Furthermore, the display support 39 includes a magnet 74 for temporarily hold the center console display 38 and for easily positioning the center console display 38 relative to the display support 39 by attracting a metal plate or magnet (not shown) disposed on the center console display 38.

In the illustrated embodiment, the center console display 38 is removably and reinstallably attached to the dashboard 34. Thus, while the off-highway vehicle 10 is parked, the center console display 38 can be removed from the off-highway vehicle 10 for security purpose, for example. Specifically, for removing the center console display 38, the display cover 52 is moved from the closed position to the open position, and the center console display 38 is removed from the display support 39 by operating the release mechanism 68.

Furthermore, in the illustrated embodiment, the display cover 52 forms a continuous surface with the center console panel 50 that surrounds the display cover 52. Thus, a sense of unity in dashboard design can be achieved even when the center console display 38 is attached to the dashboard 34. Specifically, the center console display 38 can be installed into the center console 40 without protruding from the top surface of the dashboard 34 even though the center console display 38 is a removable display. In the illustrated embodiment, the center console display 38 can be waterproof or water-resistant. Thus, in this case, the display cover 52 does not need to have a waterproof or water-resistant structure.

In the illustrated embodiment, the front and top cover portions 54 and 56 are movable as a unit between the closed and open positions. With this configuration, the center console display receiving space 34b can largely exposed when the display cover 52 is positioned in the open position. Thus, even if soil or mud enters the center console display receiving space 34b, it is easy to remove the soil or mud. Thus, it can be prevented that the center console display 38 is not properly connected to the display support 39 due to soil or mud. In particular, in a case in which a top cover portion of a display cover is only movable for inserting a display, once soil or mud enters, it is difficult to remove the soil or mud and is difficult to properly install the display.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Thus, as used herein, the singular forms "a," "an" and "the" are intended to include the plural forms as well, unless the context clearly indicates otherwise. Also, the terms "part," "section," "portion," "member" or "element" when used in the singular can have the dual meaning of a single part or a plurality of parts. Unless otherwise defined, all terms (including technical and scientific terms) used herein have the same meaning as commonly understood by one of ordinary skill in the art to which illustrative embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

It will be understood that when an element is referred to as being "connected" or "coupled" to another element, it can be directly connected or coupled to the other element or intervening elements may be present. In contrast, when an element is referred to as being "directly connected" or "directly coupled"" to another element, there are no intervening elements present. As used herein the term "and/or" includes any and all combinations of one or more of the associated listed items. Additionally, similar words used to describe the relationship between elements or layers should be interpreted in a like fashion (e.g., "between" versus "directly between", "above" versus "directly above", "below" versus "directly below", "adjacent" versus "directly adjacent," "on" versus "directly on"). Thus, components that are shown directly connected or contacting each other can have intermediate structures disposed between them unless specified otherwise.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

Also, it will be understood that, although the terms "first", "second", etc. may be used herein to describe various elements, components, regions, positions and/or sections, these elements, components, regions, positions and/or sections should not be limited by these terms. These terms are only used to distinguish one element, component, region, layer, position or section from another element, component, region, layer, position or section. Thus, a first element, component, region, position or section discussed above could be termed a second element, component, region, position or section without departing from the teachings of illustrative embodiments.

Spatially relative terms, such as "forward", "rearward", "above", "below", "beneath", "downward", "vertical", "horizontal", and "transverse" as well as any other similar spatial terms may be used herein for the ease of description to describe one element or feature's relationship to another element(s) or feature(s) of the above embodiments. These spatially relative terms, as utilized to describe the present invention should be interpreted relative to a vehicle on a flat horizontal surface and with respect to a direction in which a driver looks straight when seated on a driver's seat in a straight forward driving direction. Thus, front, rear, left and right shown in the description of the preferred embodiments indicate the front, rear, left and right, respectively, when viewed from a vehicle occupant seated on a seat. The terms of degree such as "substantially", "about" and "approximately" as used herein mean an amount of deviation of the modified term such that the end result is not significantly changed.

While only selected embodiments have been chosen to illustrate the present invention, it will be apparent to those skilled in this field from this disclosure that various changes and modifications can be made herein without departing from the scope of the invention as defined in the appended claims. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle dashboard assembly comprising:
   a dashboard panel having a display receiving space;
   a display support coupled to the dashboard panel;
   a display removably and reinstallably attached to the display support; and
   a display cover movably coupled relative to the dashboard panel between a closed position and an open position, the display cover being movable relative to the display support and the display between the closed position and the open position while the display is being attached to the display support, the display cover including a first cover portion for covering a front side of the display and a second cover portion for covering one edge of the display, the first cover portion covering the front side of the display to entirely surround an outer periphery of a screen of the display while in the closed position and including a peripheral edge that defines a display opening through which the screen is viewable while in the closed position, an entirety of the peripheral edge of the first cover portion overlapping with an outer peripheral portion of the display that entirely surrounds the outer periphery of the screen of the display as viewed from the front side of the display while in the closed position, and the first and second cover portions being movable as a unit between the closed and open positions.

2. The vehicle dashboard assembly according to claim 1, wherein
the display cover is pivotally mounted relative to the dashboard panel.

3. The vehicle dashboard assembly according to claim 1, wherein
the second cover portion covers a top edge of the display.

4. The vehicle dashboard assembly according to claim 3, wherein
the display cover is pivotally mounted relative to the dashboard panel adjacent of a bottom edge of the display.

5. The vehicle dashboard assembly according to claim 1, wherein
the display support includes a lock for locking the display relative to the dashboard panel.

6. The vehicle dashboard assembly according to claim 5, wherein
the lock is a key lock.

7. The vehicle dashboard assembly according to claim 1, wherein
the first cover portion include an auxiliary opening.

8. The vehicle dashboard assembly according to claim 1, further comprising
a trim panel attached to the dashboard panel and surrounding the display receiving space.

9. The vehicle dashboard assembly according to claim 8, wherein
the second cover portion forms a continuous surface with a portion of the trim panel.

10. The vehicle dashboard assembly according to claim 1, wherein
the second cover portion includes a visor overhanging the display opening.

11. The vehicle dashboard assembly according to claim 1, wherein
the display cover has a snap-fit connection that mates with the dashboard panel in the closed position.

12. The vehicle dashboard assembly according to claim 1, wherein
the display receiving space is defined by a wall including at least one drain opening.

13. The vehicle dashboard assembly according to claim 1, wherein
the display receiving space is defined by a wall including a support abutment that is spaced from the display support to support a portion of the display when the display cover is in the closed position.

14. The vehicle dashboard assembly according to claim 13, wherein
the display includes a control switch located in an area of the support abutment.

15. The vehicle dashboard assembly according to claim 1, wherein
the display receiving space is defined by a wall including at least one reinforcing rib located adjacent to the display support.

16. The vehicle dashboard assembly according to claim 1, wherein
the display support includes a set of first electrical contacts, and
the display includes a set of second electrical contacts that mates with the first electrical contacts.

17. The vehicle dashboard assembly according to claim 1, wherein
the display is configured to display at least one vehicle condition.

18. The vehicle dashboard assembly according to claim 1, wherein
the display is releasably coupled to the display support by a latch.

19. A vehicle comprising:
a vehicle frame defining a passenger compartment; and
a vehicle dashboard assembly provided to the passenger compartment, the vehicle dashboard assembly including
a dashboard panel having a display receiving space,
a display support coupled to the dashboard panel,
a display removably and reinstallably attached to the display support, and
a display cover movably coupled relative to the dashboard panel between a closed position and an open position, the display cover being movable relative to the display support and the display between the closed position and the open position while the display is being attached to the display support, the display cover including a first cover portion for covering a front side of the display and a second cover portion for covering one edge of the display, the first cover portion covering the front side of the display to entirely surround an outer periphery of a screen of the display while in the closed position and including a peripheral edge that defines a display opening through which the screen is viewable while in the closed position, an entirety of the peripheral edge of the first cover portion overlapping with an outer peripheral portion of the display that entirely surrounds the outer periphery of the screen of the display as viewed from the front side of the display while in the closed position, and the first and second cover portions being movable as a unit between the closed and open positions.

* * * * *